H. HAINES.
Machine for Cutting Sheaf Bands.
No. 47,013.
Patented March 28, 1865.
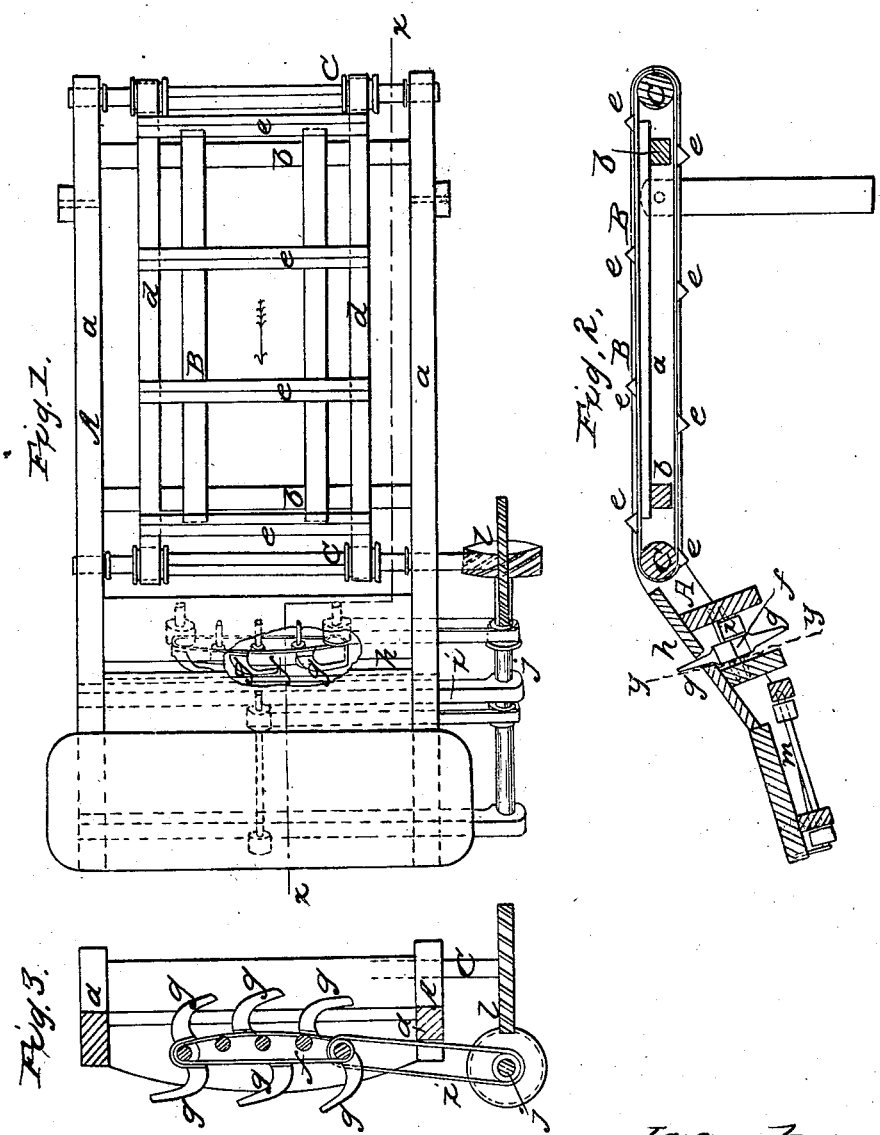

UNITED STATES PATENT OFFICE.

HENRY HAINES, OF FARLEY, IOWA.

IMPROVED MACHINE FOR CUTTING SHEAF-BANDS.

Specification forming part of Letters Patent No. 47,013, dated March 28, 1865.

*To all whom it may concern:*

Be it known that I, HENRY HAINES, of Farley, in the county of Dubuque and State of Iowa, have invented a new and Improved Machine for Cutting Sheaf-Bands; and I do hereby declare that the following is a full, clear, and exact description thereof, which will enable those skilled in the art to make and use the same, reference being had to the accompanying drawings, forming part of this specification, in which—

Figure 1 is a plan or top view of my invention; Fig. 2, a side sectional view of the same, taken in the line $x\ x$, Fig. 1; Fig. 3, a transverse vertical section of the same, taken in the line $y\ y$, Fig. 2.

Similar letters of reference indicate corresponding parts.

This invention relates to a new and useful machine for cutting the bands of grain-sheaves while the same are being fed to a thrashing-machine.

The object of the invention is to obviate the necessity of untying the sheaf-bands preparatory to feeding the grain to the thrashing-machine.

A represents a frame composed of two side pieces, $a\ a$, connected by cross pieces $b\ b$. The inner part of this frame A is curved downward, and is connected by hooks or otherwise to the feed end of a thrashing-machine, while the outer part is supported by standards. The outer part of the frame A is about horizontal, and it has an endless carrier, B, fitted in it, working over pulleys on shafts $c\ c$, said carrier being composed of two parallel belts, $d\ d$, having slats $e$ attached to them at right angles and at suitable distances apart to admit of the sheaves of grain being placed on the belts between the slats. In the inclined part of the frame there is placed transversely an endless belt, $f$, having cutters $g$ attached to them. These cutters are of hook form, and when the device is in operation their outer parts work through a transverse slot or opening, $h$, in the inclined part of frame A, as shown clearly in Fig. 2. The endless cutter-belt $f$ is driven by a belt, $i$, from a shaft, $j$, at one side of the frame A, said shaft communicating motion to the inner shaft of the carrier B by means of gears $l$ and the shaft $j$ driven from a shaft, $m$, which receives its motion from a shaft on the thrashing-machine. The direction of the movement of the carrier and cutter-belt is shown clearly by the arrows in Fig. 1. The bound sheaves are placed transversely on the carrier B between the slats $e$, the carrier conveying the sheaves to the inclined part of the frame A, down which they pass and over the cutters $g$, the latter severing the bands of the sheaves, in consequence of projecting up through the slot or opening $h$. The straw, being thus liberated from the bands, passes down into the mouth of the thrashing-machine.

Thus, by this simple means I obtain a device which effectually obviates the necessity of untying the sheaf-bands preparatory to feeding the grain into the thrashing machine.

Having thus described my invention, I claim as new and desire to secure by Letters Patent—

The endless carrier, in combination with the endless belt of knives, said parts being placed within a suitable frame connected with the thrashing-machine, and all arranged to operate in the manner substantially as and for the purpose herein set forth.

HENRY HAINES.

Witnesses:
JOSEPH A. KERLE,
WILLIAM BAKER.